(12) United States Patent
Borders

(10) Patent No.: US 8,079,080 B2
(45) Date of Patent: Dec. 13, 2011

(54) METHOD, SYSTEM AND COMPUTER PROGRAM PRODUCT FOR DETECTING SECURITY THREATS IN A COMPUTER NETWORK

(75) Inventor: Kevin R. Borders, White Lake, MI (US)

(73) Assignees: Mathew R. Syrowik, Southfield, MI (US), part interest; Atul Prakash, Ann Arbor, MI (US), part interest ( * ) Notice: Subject to any disclaimer, the term of this patent is extended or adjusted under 35 U.S.C. 154(b) by 1112 days.

(21) Appl. No.: 11/255,835

(22) Filed: Oct. 21, 2005

(65) Prior Publication Data
US 2007/0094725 A1    Apr. 26, 2007

(51) Int. Cl.
*G06F 11/00* (2006.01)

(52) U.S. Cl. .............. 726/22; 726/13; 726/14; 726/23; 726/24; 726/25; 709/223; 370/232

(58) Field of Classification Search ............ 709/223; 726/13, 14, 22–25; 370/232
See application file for complete search history.

(56) References Cited

U.S. PATENT DOCUMENTS

| | | |
|---|---|---|
| 6,519,703 B1 | 2/2003 | Joyce |
| 6,671,811 B1 | 12/2003 | Diep et al. |
| 6,681,331 B1 | 1/2004 | Munson et al. |
| 6,708,212 B2 | 3/2004 | Porras et al. |
| 6,772,345 B1 | 8/2004 | Shetty |
| 6,801,940 B1 | 10/2004 | Moran et al. |
| 7,065,657 B1 * | 6/2006 | Moran .............................. 726/5 |
| 7,069,330 B1 * | 6/2006 | McArdle et al. ............. 709/229 |
| 7,920,705 B1 * | 4/2011 | Bean ............................. 380/270 |
| 2002/0035628 A1 | 3/2002 | Gil et al. |
| 2002/0133586 A1 | 9/2002 | Shanklin et al. |
| 2003/0004688 A1 | 1/2003 | Gupta et al. |
| 2003/0051026 A1 | 3/2003 | Carter et al. |
| 2003/0159070 A1 | 8/2003 | Mayer et al. |
| 2003/0212903 A1 | 11/2003 | Porras et al. |
| 2003/0236652 A1 | 12/2003 | Scherrer et al. |
| 2004/0034794 A1 | 2/2004 | Mayer et al. |
| 2004/0054925 A1 | 3/2004 | Etheridge et al. |
| 2004/0114519 A1 * | 6/2004 | MacIsaac ...................... 370/232 |
| 2004/0143749 A1 * | 7/2004 | Tajalli et al. ................. 713/200 |
| 2004/0205419 A1 * | 10/2004 | Liang et al. .................... 714/57 |
| 2004/0221191 A1 | 11/2004 | Porras et al. |
| 2004/0250124 A1 | 12/2004 | Chesla et al. |
| 2004/0250134 A1 | 12/2004 | Kohler et al. |
| 2005/0021740 A1 | 1/2005 | Bar et al. |
| 2005/0033989 A1 | 2/2005 | Poletto et al. |

(Continued)

OTHER PUBLICATIONS

Kruegel et al., "A multi-model approach to the detection of web-based attacks", Computer Networks: The International Journal Computer and Telecommunications Networking, vol. 48, Issue 5, Aug. 2005.*

(Continued)

*Primary Examiner* — Vivek Srivastava
*Assistant Examiner* — Hee Song
(74) *Attorney, Agent, or Firm* — Brooks Kushman P.C.

(57) ABSTRACT

A method, system and computer program product detect attempts to send significant amounts of information out via HTTP tunnels to rogue Web servers from within an otherwise firewalled network. A related goal is to help detect spyware programs. Filters, based on the analysis of HTTP traffic over a training period, help detect anomalies in outbound HTTP traffic using metrics such as request regularity, bandwidth usage, inter-request delay time, and transaction size.

24 Claims, 7 Drawing Sheets

U.S. PATENT DOCUMENTS

| | | | |
|---|---|---|---|
| 2005/0044406 | A1 | 2/2005 | Stute |
| 2005/0076236 | A1 | 4/2005 | Stephenson |
| 2005/0108393 | A1 | 5/2005 | Banerjee et al. |
| 2005/0120242 | A1* | 6/2005 | Mayer et al. ................. 713/201 |
| 2005/0188215 | A1* | 8/2005 | Shulman et al. ............. 713/188 |
| 2006/0037077 | A1* | 2/2006 | Gadde et al. .................... 726/23 |

OTHER PUBLICATIONS

Dr. Robert F. Erbacher, "Intrusion Detection Visualization and Software Architecture for the Detection of Compentent Attacks", http://www.cs.usu.edu/~erabacher/publications/VFRP-Final-Report-Erbacher-2004.pdf. Aug. 2004.*

Wang et al., "Anomalous payload-based Network Intrusion Detection", http://www1.cs.columbia.edu/ids/publications/RAID-final.pdf. 2004.*

Castro, Simon., "Covert Channel and Tunneling over the HTTP protocol Detection: GW implementation theoretical design v1.1", Nov. 2003, http://www.infosecwriters.com/hhworld/cctde.html, pp. 1-17.*

Cabuk et al., "IP Covert Timing Channels: Design and Detection", CCS'04, http://www.cs.jhu.edu/~fabian/courses/CS600.624/covert.pdf, Oct. 25-29, 2004, pp. 178-187.*

Kruegel et al., "A multi-model approach to hte detection of web-based attacks", Computer Networks: The International Journal Computer and Telecommunications Networking, vol. 48, Issue 5, Aug. 2005.*

Robin Sommer, "Bro: An Open Source Network Intrusion Detection System,", http://www.icir.org/robin/papers/dfntag03.ps, pp. 1-17, 2003.*

Castro2, CCTDE (http://www.gray-world.net/pr_cctde.shtml), 2004.*

Kruegel, "Anomaly Detection of Web-based Attacks", 2003, pp. 1-11, http://www.cs.ecsb.edu/~vigna/publications/2003_kruegel_vigna_ccs03.pdf.*

Ad-Aware, http://www.lavasoftusa.com/software/adaware/, 2004.

Barbara, D., et al., Mining Malicious Data Corruption With Hidden Markov Models, 16th Annual IFIP WG 11.3 Working Conference on Dat and Application Security, Jul. 2002.

Barford, P., et al., Changes in Web Client Access Patterns: Characteristics and Caching Implications, BU Computer Science Technical Report, BUCS-TR-1998-023,1998.

Berman, J., Prepared Statement of Jerry Berman, President, the Center for Democracy & Technology on the Spy Block Act, Before the Senate Committee on Commerce, Science, and Transportation Subcommittee on Communication, Mar. 2004.

BlackICE PC Protection, http://blackice.iss.net/, 2004.

CERT Vulnerability Note VN-98.07, http://www.cert.org/vulnotes/VN-98.07.backorifice.html, Oct. 1998.

CERT Advisory CA-2003-22 Multiple Vulnerabilities in Microsoft Internet Explorer, http://www.cert.org/advisories/CA-2003-22.html, Aug. 2003.

Cheswick, B., An Evening with Berferdin which a cracker is Lured, Endured, and Studied, USENIX proceedings, Jan. 1990.

Denning, D.E., An Intrusion Detection Model, IEEE Transactions on Software Engineering, 13(2):222-232, Feb. 1987.

Duska, B., et al., The Measured Access Characteristics of World Wide Web Client Proxy Caches, Proc. of USENIX Symposium on Internet Technology and Systems, Dec. 1997.

Dyatlov, A., Firepass, http://www.gray-world.net/pr_firepass.shtml, 2004.

Dyatlov, A., et al., Wsh 'Web Sell', http://www.grayworld.net/pr_wsh.shtml, 2004.

EyeOnSecurity, http://eyeonsecurity.orq/advisories/Gator/, 2002, pp. 1-176.

Fielding, R., et al., Hypertext Transfer Protocol HTTP/1.1, RFC 2616, Jun. 1999.

Forrest, S., et al., A Sense of Self for Unix Processes, Proc. of the IEEE Symposium on Security and Privacy, pp. 120-128, May 1996.

Ghosh, A.K., et al., Detecting Anomalous and Unknown Intrusions Against Programs, Proc. of the Annual Computer Security Applications Conference (ACSAC '98), pp. 259-267, Dec. 1998.

HISAO, S., Tiny HTTP Proxy, http://mail.python.org/pipermail/python-list/2003-June/168957.html, Jun. 2003.

Hopster, http://www.hopster.com/,2004.

Javitz, H.S., et al., The SRI IDES Statistical Anomaly Detector, Proc. of the IEEE Symposium on Security and Privacy, May 1991.

Kelly, T, Thin-client Web Access Patterns: Measurements From A Cache-busting Proxy, Computer Communications, 25(4):357-366, Mar. 2002.

Kruegel, C., et al., Service-specific Anomaly Detection for Network Intrusion Detection, Symposium on Applied Computing (SAC), ACM Scientific Press, Mar. 2002.

Kruegel, C., et al., Anomaly Detection of Web-based Attacks, Proceedings of ACM CCS'03, pp. 251-261, 2003.

Lane, T., et al., Temporal Sequence Learning and Data Reduction for Anomaly Detection, Proc. of the 5th ACM Conference on Computer and Communications Security, pp. 150-158, 1998.

McHugh, J., Covert Channel Analysis, Handbook for the Computer Security Certification of Trusted Systems, 1995.

MIMEsweeper,http://www.mimesweeper.com/products/msw/msw_web/default.aspx, 2004.

Moskowitz I.S., et al., Covert Channels—Here to stay?, Proc. of Compass '94, pp. 235-243, 1994.

Paxson, V., Bro: A System for Detecting Network Intruders in Real-Time, Proc. of the 7th Usenix Security Symposium, Jan. 1998.

Paxson, V., et al., Wide-Area Traffic: The Failure of Poisson Modeling, IEEE/ACMTrancactions on Networking, 3(3), pp. 226-244, Jun. 1995.

Peticolas, F.A.P., et al., Information Hiding—A Survey, Proceedings of the IEEE, special issue on protection of multimedia content, 87(7):1062-1078, Jul. 1999.

Saroiu, S., et al., Measurement and Analysis of Spyware in a University Environment, Proc. of the First Symposium on Networked Systems Design and Implementation, pp. 141-153, Mar. 2004.

Roesch, M., Snort—Lightweight Intrusion Detection for Networks, Proc. of the USENIX LISA '99 conference, Nov. 1999.

Spybot-Search and Destroy, http://www.safer-networking.org/, 2004.

SpywareBlaster, http://www.javacoolsoftware.com/spywareblaster.html/, 2004.

Tan, K.,,et al., Why 6? Defining the Operational Limits of Stide, an Anomaly-Based Intrusion Detector, Proc. of the IEEE Symposium on Security and Privacy, pp. 188-202, May 2002.

Websense, http://www.websense.com/products/about/howitworks/index.cfm, 2004.

Ye, N., et al., Robustness of Markov Chain Model for Cyber Attack Detection, IEEE Transactions on Reliability, 52(3), Sep. 2003.

Zhang, Y., et al., Detecting Backdoors, Proc. of the 9th USENIX Security Symposium, Aug. 2000.

* cited by examiner

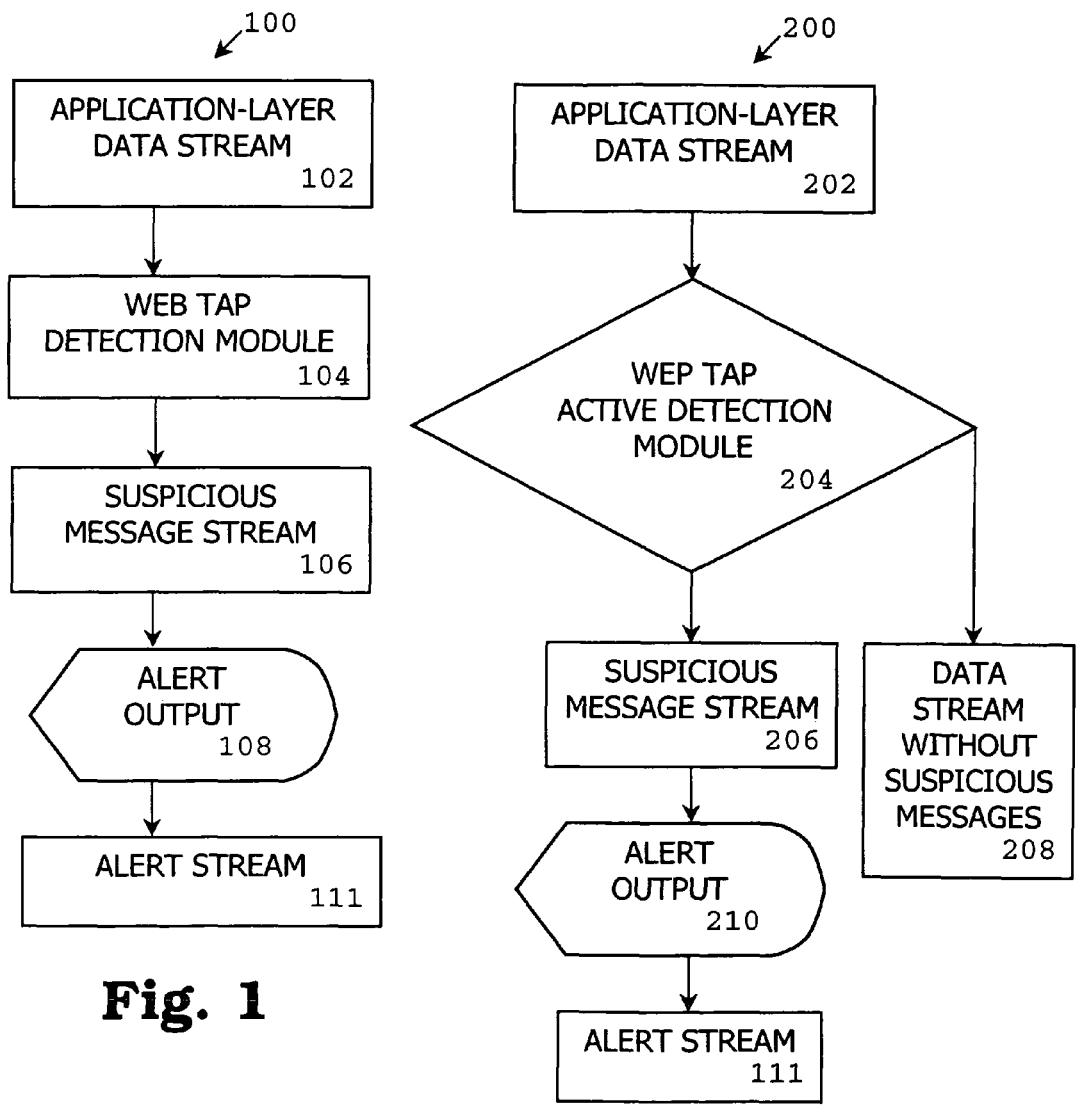

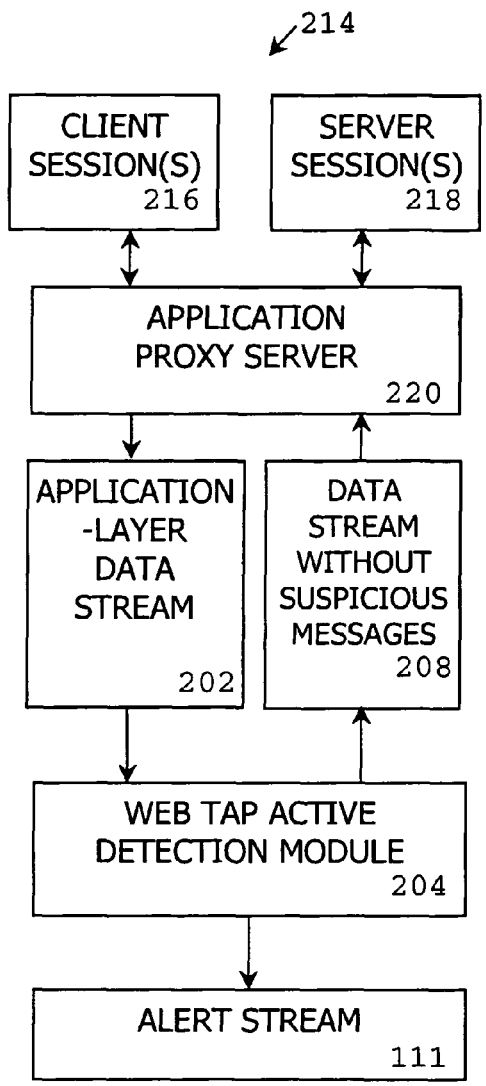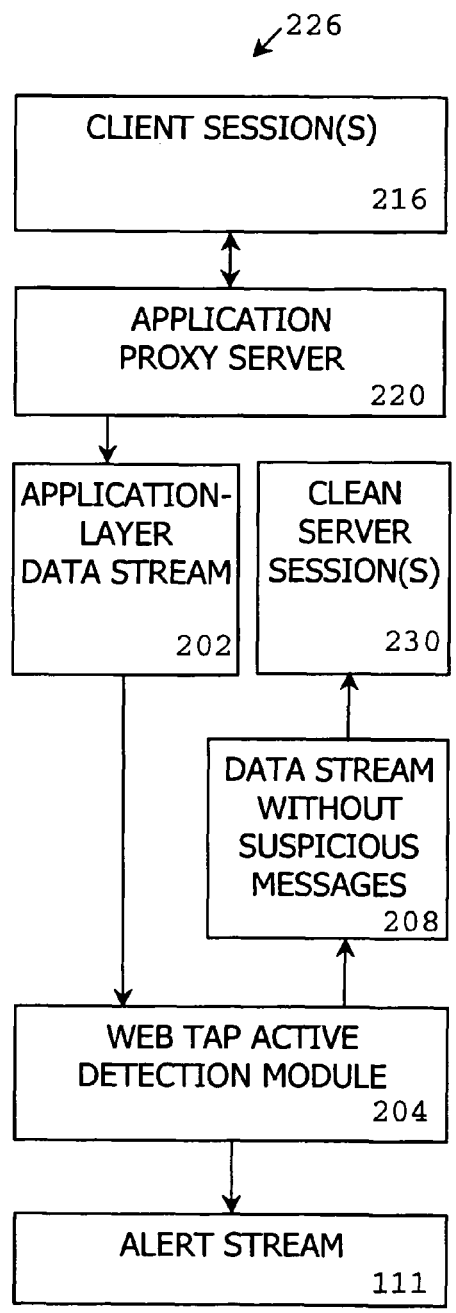
Fig. 4a
Fig. 4b

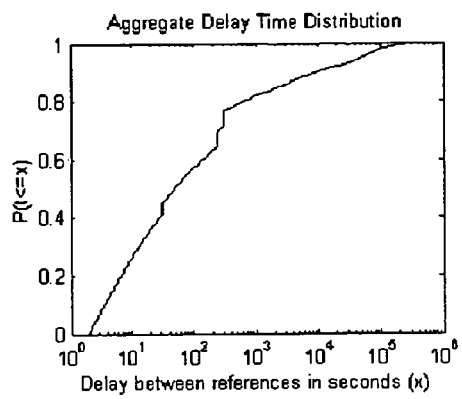
Fig. 7
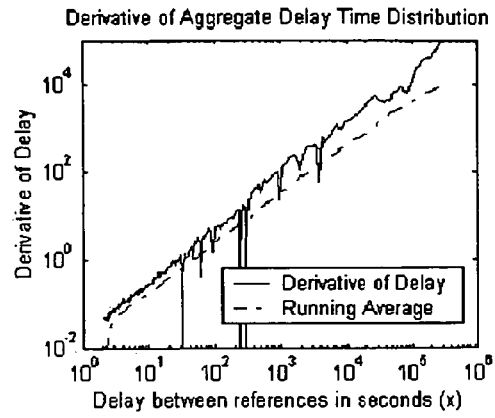
Fig. 8
$$\text{Derivative of Delay} = \begin{cases} 0 & t < 2 \\ |V(t) - V(t-1)| & 2 \le t \le Size(V) \end{cases}$$
$$\text{Running Average} = \frac{.8 * \sum_{i=1}^{a} Derivative(t-i)}{a} \quad 1 \le t \le Size(V)$$
Fig. 9
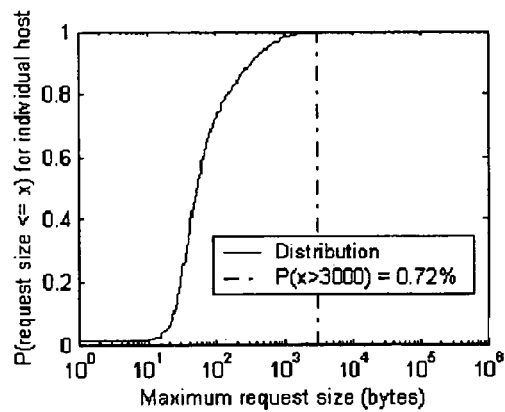
Fig. 10
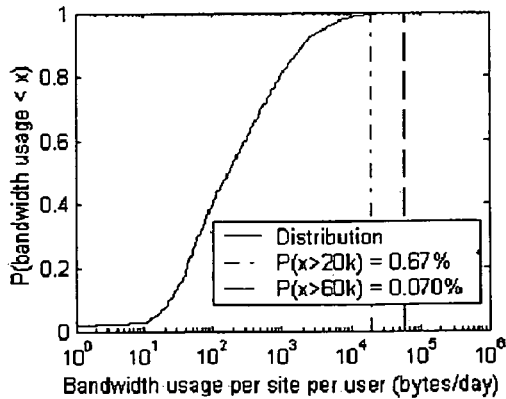
Fig. 11

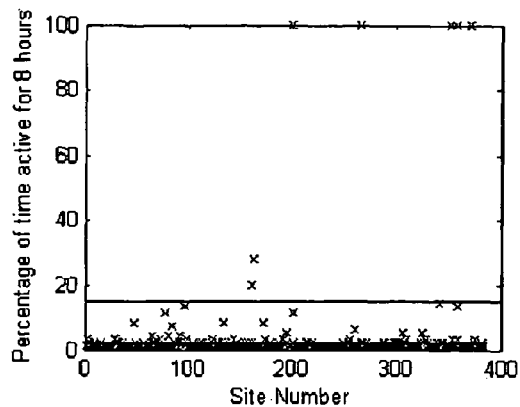

Fig. 12

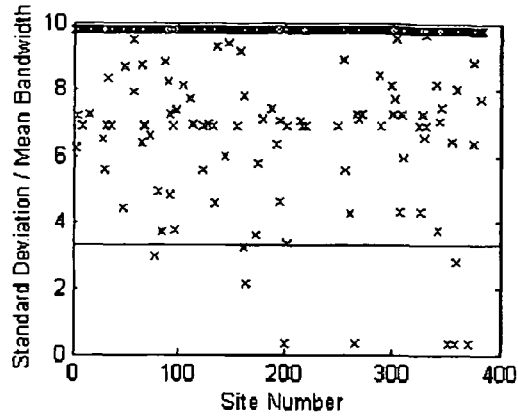

Fig. 13

```
Hour:        | 1                      24
Mar 26(Fri)  | ----------------XXXXXXXX
Mar 27(Sat)  | --X---------------------
Mar 28(Sun)  | ------------------------
Mar 29(Mon)  | ---------------XX--XXX-X
Mar 30(Tue)  | X--XX----------XXXXXXXX
Mar 31(Wed)  | ---------------XXXXXXXX-
```

Fig. 14

| Filter Name | | Number of Alerts Over 40 Days | Average Alerts Per Day | False Alarm Rate (Approximate) | False Alarm Requests |
|---|---|---|---|---|---|
| Header Format | | 240 | 6.00 | 0% (Exact) | Legitimate browser |
| Delay Time | | 118 | 2.95 | 5% | Not running on a timer |
| Individual Request Size | | 38 | 0.95 | 34% | Not upload or spyware |
| Request Regularity | 8-Hour | 132 | 3.30 | 11% | Not spyware/adware, ad server, or a timer. |
| | 48-hour | 65 | 1.63 | 7% | |
| Daily Bandwidth | 20 KB | 106 | 2.65 | 32% | Not spyware/adware, not an ad server, not a file upload, not running on a timer, and not a non-browser client |
| | 30 KB | 59 | 1.48 | 17% | |
| | 40 KB | 39 | 0.98 | 15% | |
| | 50 KB | 26 | 0.65 | 12% | |
| | 60 KB | 18 | 0.45 | 0% | |
| | 70 KB | 14 | 0.35 | 0% | |
| | 80 KB | 12 | 0.30 | 0% | |
| Time of Day | | 68 | 2.62 (Not Including | 28% | Anything when the user is present and active |
| Aggregate | | 767 | 19.2 | 12% (2.3 per day) | |

Fig. 15

METHOD, SYSTEM AND COMPUTER PROGRAM PRODUCT FOR DETECTING SECURITY THREATS IN A COMPUTER NETWORK

BACKGROUND OF THE INVENTION

1. Field of the Invention

This invention relates to methods, systems and computer program products for detecting security threats in a computer network.

2. Background Art

Below is a list of publications related to the present invention and referenced herein:

[1] Ad-Aware, http://www.lavasoftusa.com/software/adaware/, 2004

[2] D. Barbara, R. Goel, and S. Jajodia. Mining Malicious Data Corruption with Hidden Markov Models. 16th Annual IFIP WG 11.3 Working Conference on Data and Application Security, July 2002.

[3] P. Barford, A. Bestavros, A. Bradley, and M. Crovella, Changes in Web client access patterns: Characteristics and caching implications, BU Computer Science Technical Report, BUCS-TR-1998-023, 1998.

[4] J. Berman, Prepared Statement of Jerry Berman, President, the Center For Democracy & Technology On the SPY BLOCK Act, Before the Senate Committee On Commerce, Science, And Transportation Subcommittee on Communication, March 2004.

[5] BlackICE PC Protection, http://blackice.iss.net/, 2004.

[6] CERT Vulnerability Note VN-98.07, http://www.cert.org/vulnotes/VN-98.07.backorifice.html, October 1998.

[7] CERT Advisory CA-2003-22 Multiple Vulnerabilities in Microsoft Internet Explorer, http://www.cert.org/advisories/CA-2003-22.html, August 2003.

[8] B. Cheswick, An Evening with Berferd in which a cracker is Lured, Endured, and Studied, USENIX proceedings, January 1990.

[9] D. E. Denning, An Intrusion Detection Model. IEEE Transactions on Software Engineering, 13(2):222-232, February 1987.

[10] B. Duska, D. Marwood, and M. J. Feeley, The measured access characteristics of World Wide Web client proxy caches, Proc. of USENIX Symposium on Internet Technology and Systems, December 1997.

[11] A. Dyatlov, Firepass, http://www.gray-world.net/pr_firepass.shtml, 2004.

[12] A. Dyatlov, S. Castro, Wsh 'Web Shell', http://www.grayworld.net/pr_wsh.shtml, 2004.

[13] EyeOnSecurity, http://eyeonsecurity.org/advisories/Gator/, 2002.

[14] R. Fielding, J. Gettys, J. C. Mogul, H. Frystyk, L. Masinter, P. Leach and T. Berners-Lee. Hypertext Transfer Protocol HTTP/1.1, RFC 2616, June 1999.

[15] S. Forrest, A. Hofmeyr, A. Somayaji, and T. A. Longstaff, A Sense of Self for Unix Processes, Proc. of the IEEE Symposium on Security and Privacy, pp. 120-128, May 1996.

[16] A. K. Ghosh, J. Wanken, and F. Charron. Detecting Anomalous and Unknown Intrusions Against Programs. Proc. of the Annual Computer Security Applications Conference (ACSAC '98), pp. 259-267, December 1998.

[17] S. Hisao, Tiny HTTP Proxy, http://mail.python.org/pipermail/python-list/2003-June/168957.html, June 2003.

[18] Hopster, http://www.hopster.com/, 2004.

[19] H. S. Javitz and A. Valdes. The SRI IDES Statistical Anomaly Detector, Proc. of the IEEE Symposium on Security and Privacy, May 1991.

[20] T. Kelly, Thin-client Web access patterns: Measurements from a cache-busting proxy, Computer Communications, 25(4):357-366, March 2002.

[21] C. Kruegel, T. Toth, and E. Kirda. Service-specific Anomaly Detection for Network Intrusion Detection. Symposium on Applied Computing (SAC), ACM Scientific Press, March 2002.

[22] C. Kruegel and G. Vigna, Anomaly Detection of Web-based Attacks, Proceedings of ACM CCS '03, pp. 251-261, 2003.

[23] T. Lane and C. E. Brodley, Temporal sequence learning and data reduction for anomaly detection, Proc. of the 5th ACM Conference on Computer and Communications Security, pp. 150-158, 1998.

[24] J. McHugh, "Covert Channel Analysis", Handbook for the computer Security Certification of Trusted Systems, 1995.

[25] MIMEsweeper, http://www.mimesweeper.com/products/msw/msw_web/default.aspx, 2004.

[26] I. S. Moskowitz and M. H. Kang, Covert channels—Here to stay?, Proc. of COMPASS '94, pp. 235-243, 1994.

[27] V. Paxson. Bro: A System for Detecting Network Intruders in Real-Time. Proc. of the 7th Usenix Security Symposium, January 1998.

[28] V. Paxson and S. Floyd, "Wide-Area Traffic: The Failure of Poisson Modeling," IEEE/ACM Transactions on Networking, 3(3), pp. 226-244, June 1995.

[29] F. A. P. Petitcolas, R. J. Anderson, and M. G. Kuhn, Information hiding—A survey, Proceedings of the IEEE, special issue on protection of multimedia content, 87(7): 1062-1078, July 1999.

[30] S. Saroiu, S. D. Gribble, and H. M. Levy, Measurement and Analysis of Spyware in a University Environment, Proc. of the First Symposium on Networked Systems Design and Implementation, pp. 141-153, March 2004.

[31] M. Roesch. Snort—Lightweight Intrusion Detection for Networks. Proc. of the USENIX LISA '99 Conference, November 1999.

[32] Spybot—Search and Destroy, http://www.safer-networking.org/, 2004.

[33] SpywareBlaster, http://www.javacoolsoftware.com/spywareblaster.html/, 2004.

[34] K. Tan and R. Maxion. Why 6? Defining the Operational Limits of Stide, an Anomaly-Based Intrusion Detector. Proc. of the IEEE Symposium on Security and Privacy, pp. 188-202, May 2002.

[35] Websense, http://www.websense.com/products/about/howitworks/index.cfm, 2004.

[36] N. Ye, Y. Zhang, and C. M. Borror. Robustness of Markov chain model for cyber attack detection. IEEE Transactions on Reliability, 52(3), September 2003.

[37] Y. Zhang, V. Paxson, "Detecting Backdoors", Proc. of the 9th USENIX Security Symposium, August 2000.

Network security has been an increasing concern for network administrators and executives alike. Consequently, firewalls and proxy servers have become prevalent among high-security networks (and even private homes). Many networks require all traffic to the internet to go through an HTTP proxy server or mail server, allowing no direct access to the internal network. This makes the job of a hacker much more difficult than before, where direct access to network machines was available.

When a hacker attacks a network with no direct access to the internet, the first step is getting a user to access a malicious file or website. This can be done effectively by e-mailing a Trojan horse program or a link to a page which exploits the browser [7]. Once the machine is compromised, the next step is to establish a path of communication. Traditionally, this would be done by installing a backdoor program such as BackOrifice [6]. The problem with using such programs on firewalled networks is that they listen for an incoming connection on a specific port. All incoming traffic, however, is blocked. This means that the only way to communicate with a compromised machine is to have it make a callback (outbound connection). Often, the only two ways out of the network are through a mail server or through a proxy server. Since e-mail is often more closely logged and filtered, the hacker may find outbound HTTP transactions to be the best avenue for communication with a compromised workstation.

Spyware is also a huge problem for both system administrators and users alike [4]. Besides annoying users by popping up advertisements, spyware can leak information about a user's behavior or even send data on the machine to outside servers. Spyware programs can also degrade system performance and take valuable time and effort to remove. In addition to these lesser threats, security holes have been found in Gator and eZula (two popular spyware programs) that would allow a hacker to execute arbitrary code on a target machine [13,30].

Signature analysis is a commonly used technique to look for Trojan programs and to do intrusion detection. For example, Snort [31] is configured with over 2500 signature rules to detect scans and attacks. Several commercial programs detect and remove spyware from computers by using the same principle and looking for spyware program signatures [1, 32, 33]. One limitation of signature analysis techniques is that new attacks are developed frequently that existing signatures may fail to detect. For that reason, signature analysis techniques should be complemented with anomaly detection techniques.

Tracking sequences of events using Markov chains or other models has been used for host and network intrusion detection [9, 15, 16, 23, 36]. This approach is very effective for many situations such as analysis of system call traces [15] to detect tampering of applications on a system after. Anomaly detection has also been used to detect network attacks [32, 36] and attacks on web servers [22].

In [22], the focus is on detecting malicious incoming traffic to a server by building a probabilistic profile of web application parameters exported by the web server.

Zhang and Paxson describe a method for detecting backdoors [37]. They look at the timing of packet arrivals and packet sizes in order to characterize an interactive shell. For delay times, they exploited the observation that keystroke inter-arrival periods follow a Pareto distribution with a high variance [27]. For packet sizes, they excluded connections that did not contain a large enough percentage of small requests. The interactive shell component of a backdoor program controlled by a remote hacker will not send requests when the hacker types them; the backdoor server has to wait for a callback from the client before sending any data. Instead of following a Pareto distribution, the delay times will follow a distribution according to whatever algorithm the backdoor client uses to schedule callback times.

Significant research exists on human browsing patterns for proxy cache and web server performance optimizations [3, 10, 20].

A substantial body of work exists on covert channel analysis, including detection of covert channels between processes or users on the same machine [24, 26]. A report by McHugh [24] defines a covert channel as "A mechanism that can be used to transfer information from one user of a system to another using means not intended for this purpose by the system developers." Examples include manipulating CPU usage or disk utilization to communicate information. There is nothing inherently secret about HTTP transactions; they are designed to allow the exchange of information. Backdoors, however, hide data within the noise of legitimate web traffic in order to talk to their owners. These lines of communication are covert even though the channel is not. For this reason the data paths used by backdoors to secretly send information in legitimate web traffic will be referred to as tunnels.

It is also possible to prevent some HTTP tunnel activity by deploying a content-filter at the proxy server [25, 35]. Such a filter can be used to prevent people from accessing any website not on an approved list. Besides being a very restrictive policy for many organizations, this will not stop the operation of all backdoors. A well-designed tunnel could still take advantage of web e-mail via an approved site to communicate to its host. A hacker could also compromise a web server on the list of approved sites and use it for communication. If the hacker is able to place a CGI script on one of these servers, the tunnel can communicate with the script to leak information.

HTTP Tunnels

In general, if a protocol is available for communication, people have found ways to tunnel other protocols through it, bypassing any firewall restrictions based on protocols or communication ports. HTTP is no exception. Several programs provide HTTP tunneling to allow users within an organization to access non-HTTP services via HTTP proxies. One such program, Wsh [12], communicates over HTTP and provides file transfer capability as well as a remote shell from machines inside a protected network to remote servers. The program can also encrypt data if desired. Another one, Firepass [11], creates a tunnel between a client process and a remote service running on an arbitrary machine and port.

Backdoor Programs

While HTTP tunnel programs can be convenient at times for allowing legitimate users to bypass firewalls and get access to remote services, they can also present a serious security threat. The scenario presented herein is a modest extension of such a program that would allow a remote user to acquire a shell on a machine behind the firewall.

To get a better of idea how a backdoor could work, here is a model of an intrusion using such a program:

1) The hacker sends a Trojan horse program to the user, or the user to views a malicious site which exploits the browser [7]. (Much like how spyware programs can be installed.)
2) The payload of the hacker's program contains a backdoor that executes on the remote machine.

Once the backdoor program is running on the remote machine, the hacker needs some way of communicating with it. In this model, the network either has firewall rules in place to block all incoming traffic, or uses a proxy server. If the network uses a firewall, then it also blocks all outgoing packets except HTTP (TCP port 80) and DNS (UDP port 53).

After the backdoor has been installed, it calls back to a web server controlled by the hacker (or a server hosting a script written by the hacker) using HTTP requests. Callbacks can be scheduled according to a fixed-wait timer, a random-wait timer, or times of actual browsing activity. Due to the nature of HTTP protocol, all transactions must be initiated by the client computer. The threat model assumes that the hacker may make an effort to disguise messages as legitimate HTTP transactions. The communication protocol for the backdoor can hide outbound information in any header field (including the URL), or in data trailing the header for a POST request.

The backdoor then receives commands from the hacker hidden within what appears to be a normal web page. There are many clever ways of hiding data [29], and it could be fruitless to try to detect them all.

Spyware

For spyware, the threat model is exactly the same except the initial mode of compromise is different. Spyware programs often install themselves by piggybacking on legitimate software, exploiting browser vulnerabilities, or tricking a user into downloading them voluntarily [4, 30]. Once they are installed, they can use the same method of communication as the backdoor program described above.

Every internet browser has a unique header signature and utilizes a certain set of header fields.

Since most HTTP requests are small, normal web browsing activity rarely utilizes much outbound bandwidth. When a hacker is using HTTP requests for covert communication, outbound bandwidth usage is expected to be higher than the norm. The reason for this is that the hacker usually only sends short requests and small tools (executables) inbound to the computer. Outbound bandwidth, however, is needed to download sensitive documents and directory listings. From a secrecy point of view, a system administrator should be more worried about outbound than inbound traffic.

Since most hackers need a lot of outbound bandwidth, but have little available to them (without being detected), they are made to spread their requests out over a long period of time. Legitimate web traffic, on the other hand, typically occurs in short bursts.

The following U.S. patent documents are related to the present invention:

U.S. Pat. Nos. 6,519,703; 6,671,811; 6,681,331; 6,772,345; 6,708,212; 6,801,940; 2002/0133586; 2002/0035628; 2003/0212903; 2003/0004688; 2003/0051026; 2003/0159070; 2004/0034794; 2003/0236652; 2004/0221191; 2004/0114519; 2004/0250124; 2004/0250134; 2004/0054925; 2005/0033989; 2005/0044406; 2005/0021740; 2005/0108393; and 2005/0076236.

SUMMARY OF THE INVENTION

An object of the present invention is to provide an improved method, system and computer program product for detecting security threats in a computer network.

In carrying out the above object and other objects of the present invention, a method of detecting security threats in a computer network is provided. The method includes receiving a data stream which represents outbound, application layer messages from a first computer process to at least one second computer process. The computer processes are implemented on one or more computers. The method also includes monitoring the data stream to detect a security threat based on a set of heuristics related to legitimate, outbound, application layer messages, and generating a signal if a security threat is detected.

The messages may include HTTP messages.

Substantially all of the computer processes may be implemented inside the network.

At least one of the computer processes may be implemented outside of the network.

The set of heuristics may include at least one filter having a threshold which represents properties of and a desired level of security for the network.

The set of heuristics may include a plurality of filters, each of the filters having a threshold which represents properties of and a desired level of security for the network.

One of the filters may be a header format filter.
One of the filters may be an inter-request delay time filter.
One of the filters may be an individual request size filter.
One of the filters may be an outbound bandwidth usage filter.
One of the filters may be a request regularity filter.
One of the filters may be a request time of day filter.

Further in carrying out the above object and other objects of the present invention, a system for detecting security threats in a computer network is provided. The system includes a processor operable to execute computer program instructions, a memory operable to store computer program instructions executable by the processor, and computer program instructions stored in the memory. The computer program instructions perform the steps of a) receiving a data stream which represents outbound, application layer messages from a first computer process to at least one second computer process, b) monitoring the data stream to detect a security threat based on a set of heuristics related to legitimate, outbound, application layer messages, and c) generating a signal if a security threat is detected. The computer processes are implemented on one or more computers.

The messages may include HTTP messages.

Substantially all of the computer processes may be implemented inside the network.

At least one of the computer processes may be implemented outside of the network.

The set of heuristics may include at least one filter having a threshold which represents properties of and a desired level of security for the network.

The set of heuristics may include a plurality of filters, each of the filters having a threshold which represents properties of and a desired level of security for the network.

One of the filters may be a header format filter.
One of the filters may be an inter-request delay time filter.
One of the filters may be an individual request size filter.
One of the filters may be an outbound bandwidth usage filter.
One of the filters may be a request regularity filter.
One of the filters may be a request time of day filter.

Still further in carrying out the above object and other objects of the present invention, a computer program product for detecting security threats in a computer network is provided. The product includes a computer readable medium, and computer program instructions recorded on the medium and executable by a processor for performing the steps of a) receiving a data stream which represents outbound, application layer messages from a first computer process to at least one second computer process, b) monitoring the data stream to detect a security threat based on a set of heuristics related to legitimate, outbound, application layer messages, and c) generating a signal if a security threat is detected. The computer processes are implemented on one or more computers.

One could run an application proxy server on a local computer and only monitor inter-process communication between the client and the local proxy instead of inter-computer communication. Also, the data stream may include a plurality of smaller data streams and a plurality of second processes which operate on the smaller data streams either independently or dependently on each other.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a schematic diagram illustrating a passive detection mode;

FIG. 2 is a schematic diagram illustrating an active detection mode;

FIGS. 4a-4c are schematic diagrams illustrating active configurations for the active detection mode;

FIG. 7 is a graph illustrating an aggregate delay time cumulative distribution with jumps at approximately t=30 seconds, 4 minutes, and 5 minutes;

FIG. 8 is a graph illustrating a derivative of cumulative distribution and a running average used to detect anomalies;

FIG. 9 shows two equations used for the derivative and average of the delay times shown in FIGS. 1 and 2;

FIG. 10 is a graph illustrating a cumulative distribution of maximum request sizes for approximately 1,600 different sites;

FIG. 11 is a graph illustrating a cumulative distribution of bandwidth usage per site per day for 30 users over a one week period;

FIG. 12 is a graph showing that 7 sites were detected by usage counts for approximately 400 sites over 8 hours with a detection threshold;

FIG. 13 is a graph showing that 9 sites were detected using the deviation over mean during an 8 hour period with a detection threshold value of 3.3;

FIG. 14 is a table showing activity by time of day for one randomly chosen user where 12 a.m. to 1 a.m. is on the left and 11 p.m. to 12 a.m. is on the right; and FIG. 15 is a table showing a number of alerts and a false alarm rate for each filter where the row labeled "aggregate" shows results from running all the filter in parallel.

DETAILED DESCRIPTION OF THE PREFERRED EMBODIMENT(S)

Figure 3A:
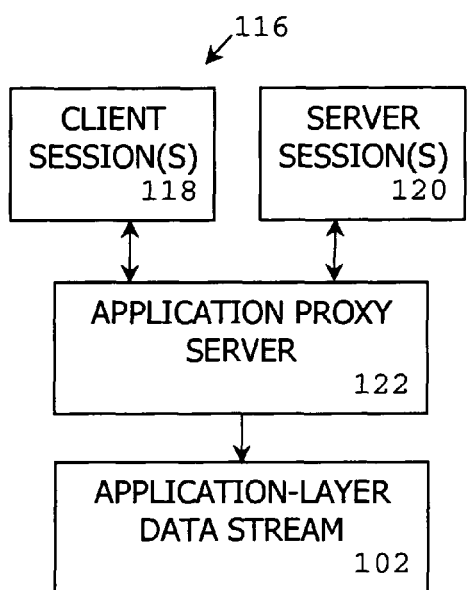
FIGS. 3a-3c are schematic diagrams illustrating passive input sources for the passive detection mode.

One embodiment of a method, system and computer program product of the present invention is referred to as "Web Tap" which detects anomalies in an application-layer data stream. Web Tap takes advantage of legitimate web request patterns to detect covert communication, backdoors, and spyware activity that is tunneled through outbound HTTP connections. Unlike the previous work on securing web servers (e.g., [22]), Web Tap's focus is on analyzing outbound HTTP traffic from protected network machines to outside web servers, rather than guarding web servers against hostile attacks. One goal is to make it more difficult for hackers or malicious users to run Trojan and HTTP tunnel programs within an organization that leak information to the outside. Web Tap is designed for deployment at an organization's HTTP proxy server (either passively or actively) to help detect anomalies in outbound traffic.

With reference to FIG. 1, a passive detection mode 100 includes an application-layer data stream of block 102, a Web Tap detection module of block 104, a suspicious message stream of block 106, an alert output of block 108, and an alert stream of block 111. The Web Tap detection module of block 104 receives the application-layer data stream of block 102. The Web Tap detection module of block 104 provides the suspicious message stream of block 106 to the alert output of block 108 as the Web Tap detection module of block 104 receives the application-layer data stream of block 102. The alert output of block 108 receives the suspicious message stream of block 106 and outputs the alert stream of block 111.

With reference to FIG. 2, an active detection mode 200 includes an application-layer data stream of block 202, a Web Tap active detection module of block 204, a suspicious message stream of block 206, a data stream without suspicious messages of block 208, an alert output of block 210, and the alert stream of block 111. The application-layer data stream of block 202 provides to the Web Tap active detection module of block 204. As the Web Tap active detection module of block 204 receives the application-layer data stream of block 202, the Web Tap active detection module of block 204 outputs the suspicious message stream of block 206 and the data stream without suspicious messages of block 208. As the Web Tap active detection module of block 204 outputs the suspicious message stream of block 206, the alert output of block 210 receives the suspicious message stream of block 206 and outputs the alert stream of block 111.

Figure 3B:
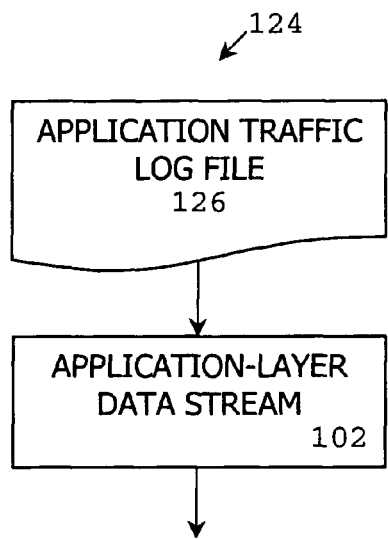
Figure 3C:
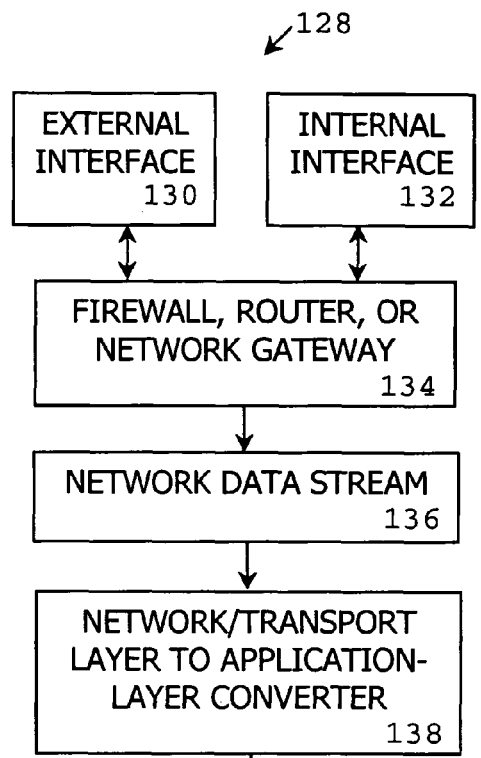

With reference to FIGS. 3a, 3b and 3c, a first passive input source 116, a second passive input source 124 and a third passive input source 128 are used for the passive detection mode 100. The first passive input source 116 (FIG. 3a) includes a client session(s) of block 118, a server session(s) of block 120, an application proxy server of block 122 and the application-layer data stream of block 102. The application proxy server of block 122 receives from the client session(s) of block 118 and the server session(s) of block 120. The application proxy server of block 122 also provides to the client session(s) of block 118 and the server session(s) of block 120. The application proxy server of block 122 outputs the application-layer data stream of block 102.

The second passive input source 124 (FIG. 3b) includes an application traffic log file of block 126 and the application-layer data stream of block 102. The application-layer data stream of block 102 receives the application traffic log file of block 126.

The third passive input source 128 (FIG. 3c) includes an external interface of block 130, an internal interface of block 132, a firewall, router, or network gateway of block 134, a network data stream of block 136, a network/transport layer to application-layer converter of block 138 and the application-layer data stream of block 102. The firewall, router, or network gateway of block 134 receives input from both the external interface of block 130 and the internal interface of block 132. The firewall, router, or network gateway of block 134 also outputs to the external interface of block 130 and the internal interface of block 132. The firewall, router, or network gateway of block 134 provides the network data stream of block 136 to the network/transport layer to application-layer converter of block 138 and the network/transport layer to application-layer converter of block 138 receives the network data stream of block 136. The network/transport layer to application-layer converter of block 138 outputs the application-layer data stream of block 102 as the network/transport layer to application-layer converter of block 138 receives the network data stream of block 136.

Figure 4C:
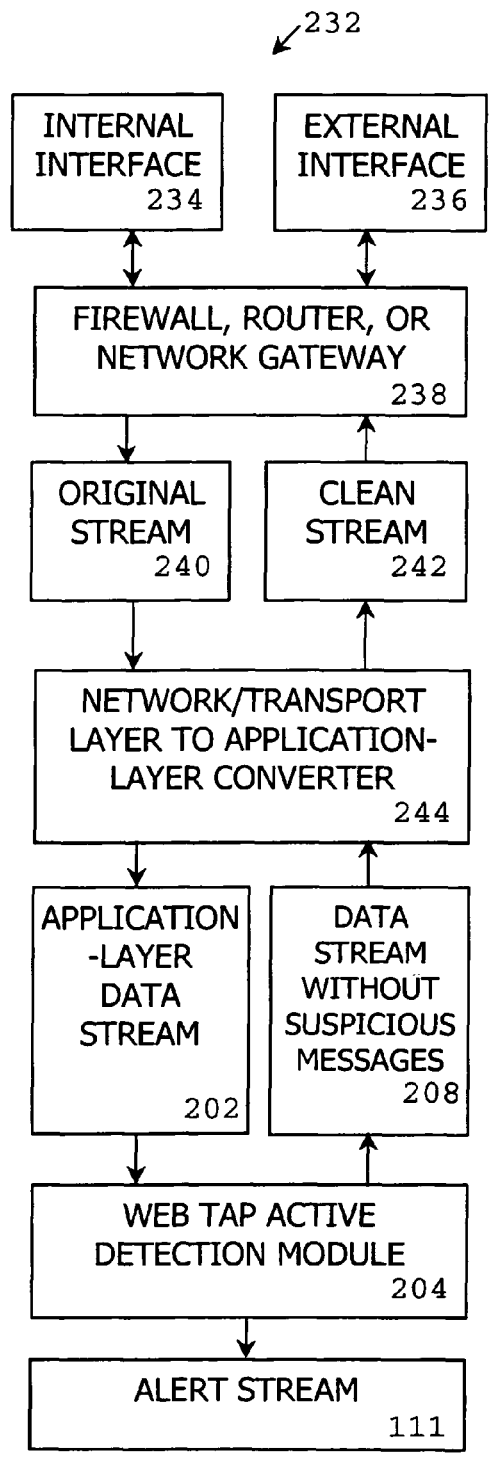

With reference to FIGS. 4a, 4b and 4c, a first active configuration 214, a second active configuration 226 and a third active configuration 232 are used for the active detection mode 200. The first active configuration 214 (FIG. 4a) includes a client session(s) of block 216, a server session(s) of block 218, an application proxy server of block 220, the application-layer data stream of block 202, the data stream without suspicious messages of block 208, the Web Tap active detection module of block 204 and the alert stream of block 111. The application proxy server of block 220 receives from the client session(s) of blocks 216, the server session(s) of block 218 and the application proxy server of block 220. The application proxy server of block 220 outputs to the client session(s) of blocks 216 and the server session(s) of block 218. The application proxy server of block 220 provides the application-layer data stream of block 202 to the Web Tap active detection module of block 204 and the Web Tap active detection module of block 204 receives the application-layer data stream of block 202. As the Web Tap active detection module of block 204 receives the application-layer data stream of block 202, the Web Tap active detection module of block 204 provides the data stream without suspicious messages of block 208 and the alert stream of block 111. The application proxy server of block 220 receives the data stream without suspicious messages of block 208 from the Web Tap active detection module of block 204.

The second active configuration 226 (FIG. 4b) includes the client session(s) of block 216, the application proxy server of block 220, the application-layer data stream of block 202, the Web Tap active detection module of block 204, the data stream without suspicious messages of block 208, a clean server session(s) of block 230, and the alert stream of block 111. The application proxy server of block 220 receives the client session(s) of block 216 and provides the application-layer data stream of block 202 to the Web Tap active detection module of block 204. The application proxy server of block 220 also provides to the client session(s) of block 216. The Web Tap active detection module of block 204 outputs the data stream without suspicious messages of block 208 to the clean server session(s) of block 230. The Web Tap active detection module of block 204 also outputs the alert stream of block 111 after receiving the application-layer data stream of block 202.

The third active configuration 232 (FIG. 4c) includes an internal interface of block 234, an external interface of block 236, a firewall, router, or network gateway of block 238, an original stream of block 240, a clean stream of block 242, a network/transport layer to application-layer converter of block 244, the application-layer data stream of block 202, the data stream without suspicious messages of block 208, the Web Tap active detection module of block 204 and the alert stream of block 111. The firewall, router, or network gateway of block 238 receives input from both the internal interface of block 234 and the external interface of block 236. The network gateway of block 238 also receives from the clean stream of block 242. Block 238 outputs to block 234 and block 236. The network gateway of block 238 provides the original stream of block 240 to the network/transport layer to application-layer converter of block 244 and the network/transport layer to application-layer converter of block 244 receives the original stream of block 240. The network/transport layer to application-layer converter of block 244 provides the clean stream of block 242 to the network gateway of block 238 after receiving the original stream of block 240. The network/transport layer to application-layer converter of block 244 outputs the application-layer data stream of block 202 to the Web Tap active detection module of block 204. The Web Tap active detection module of block 204 receives the application-layer data stream of block 202 and outputs the data stream without suspicious messages of block 208 to the network/transport layer to application-layer converter of block 244. The Web Tap active detection module of block 204 also provides the alert stream of block 111.

Figure 5A:
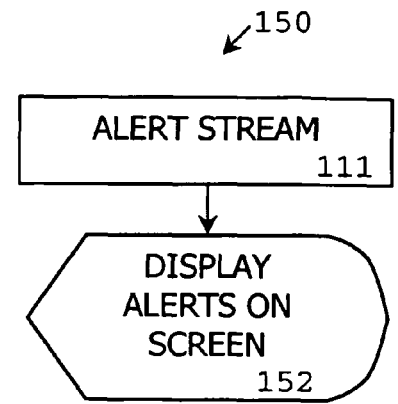
FIGS. 5a-5c are schematic diagrams illustrating alert output sinks for the passive detection mode and for the active detection mode.
Figure 5B:
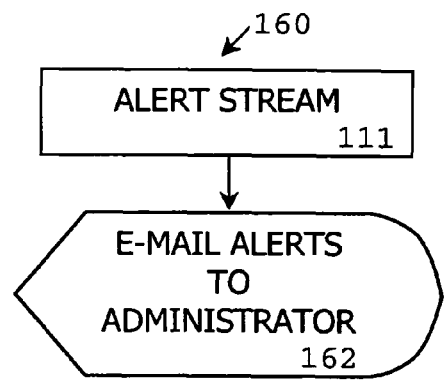
Figure 5C:
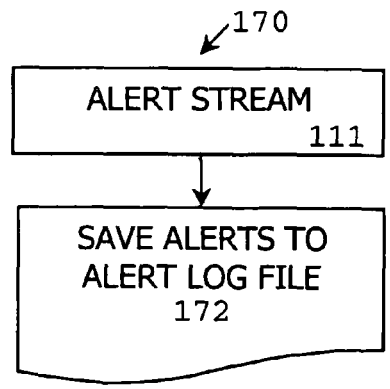

With reference to FIGS. 5a, 5b and 5c, a first alert output sink of block 150, a second alert output sink of block 160 and a third alert output sink of block 170 may be used for the passive detection mode 100 and for the active detection mode 200. The first alert output sink 150 (FIG. 5a) includes a display alerts on screen of block 152 which receives the alert stream of block 111. The second alert output sink of block 160 (FIG. 5b) includes an e-mail alerts to administrator of block 162 which receives the alert stream of block 111. The third alert output sink 170 (FIG. 5a) includes a save alerts to alert log file of block 172 which receives the alert stream of block 111.

Figure 6:
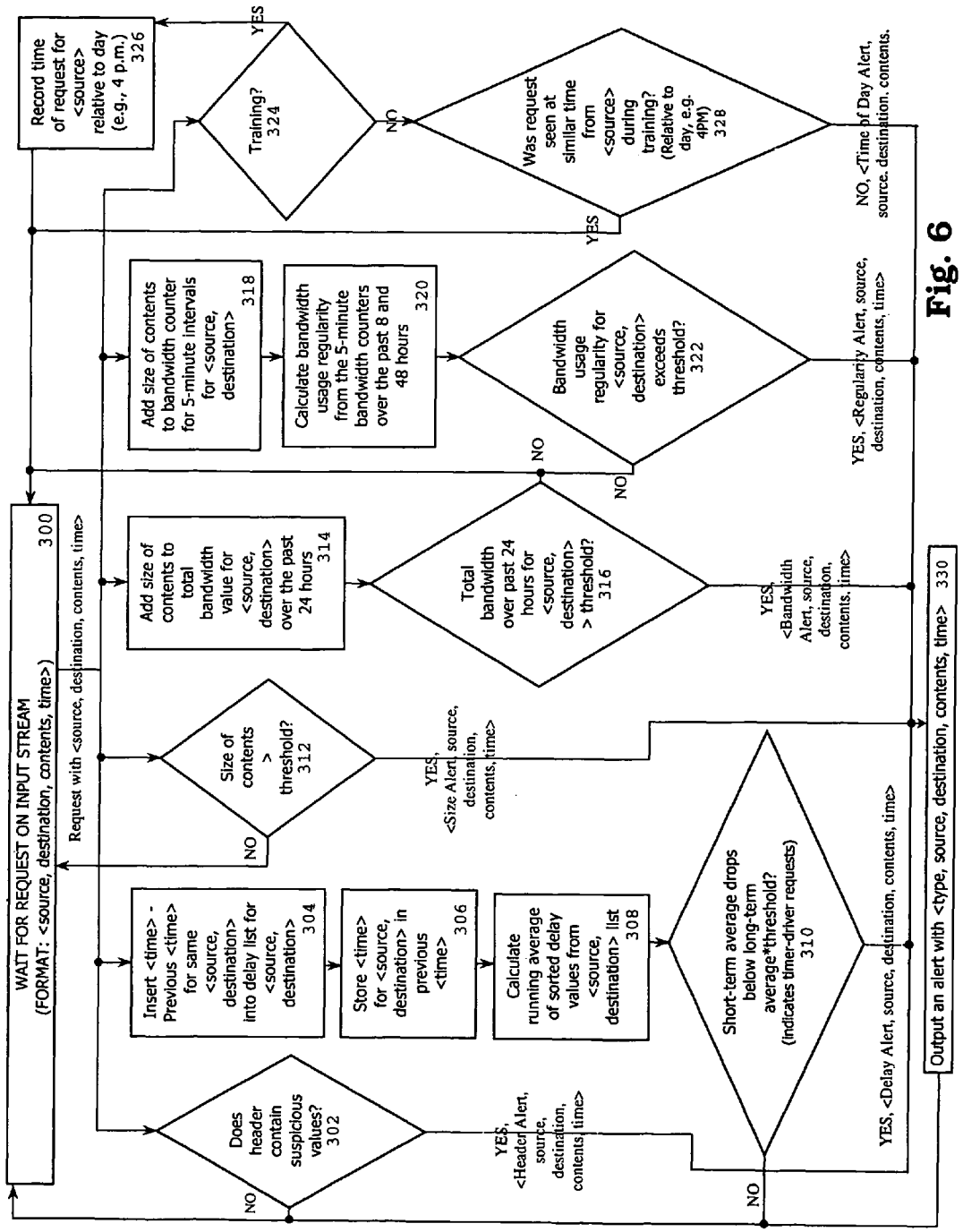
FIG. 6 is a schematic diagram illustrating the program flow of a method, system, and computer program for detecting security threats in a computer network.

With reference to FIG. 6, a "wait for request on input stream" of block 300 outputs to a "Does header contain suspicious values" of block 302, a "Insert <time>–Previous <time> for same <source, destination> into delay list for <source, destination>" of block 304, a "Size of contents> threshold?" of block 312, a "Add size of contents to total bandwidth value for <source, destination> over the past 24 hours" of block 314, a "Add size of contents to bandwidth counter for 5-minute intervals for <source, destination>" of block 318 and a "Training?" of block 324.

The "Does header contain suspicious values" of block 302 receives the "wait for request on input stream" of block 300 and outputs to an "Output an alert with <type, source, destination, contents, time>" of block 330 and the "wait for request on input stream" of block 300.

After the "Insert <time>–Previous <time> for same <source, destination> into delay list for <source, destination>" of block 304 receives output from the "wait for request on input stream" of block 300, the "Insert <time>–Previous <time> for same <source, destination> into delay list for <source, destination>" of block 304 outputs to a "Store <time> for <source, destination> in previous <time> of block 306. The "Store <time> for <source, destination> in previous <time> of block 306 receives output from the "Insert <time>–Previous <time> for same <source, destination> into delay list for <source, destination>" of block 304 and outputs to a "Calculate running average of sorted delay values from <source, destination> list" of block 308. After the "Calculate running average of sorted delay values from <source, destination> list" of block 308 receives output from the "Store <time> for <source, destination> in previous <time> of block 306, the "Calculate running average of sorted delay values from <source, destination> list" of block 308 outputs to a "Short-term average drops below long-term average*threshold?" of block 310. The "Short-term average drops below long-term average*threshold?" of block 310 receives output from the "Calculate running average of sorted delay values from <source, destination> list" of block 308 and outputs to the "wait for request on input stream" of block 300 and the "Output an alert with <type, source, destination, contents, time>" of block 330.

The "Size of contents>threshold?" of block 312 receives output from the "wait for request on input stream" of block 300 and outputs to the "wait for request on input stream" of block 300 and the "Output an alert with <type, source, destination, contents, time>" of block 330.

After the "Add size of contents to total bandwidth value for <source, destination> over the past 24 hours" of block 314 receives output from the "wait for request on input stream" of block 300, the "Add size of contents to total bandwidth value for <source, destination> over the past 24 hours" of block 314 outputs to a "Total bandwidth over past 24 hours for <source, destination>>threshold?" of block 316. After the "Total bandwidth over past 24 hours for <source, destination>>threshold?" of block 316 receives output from "Add size of contents to total bandwidth value for <source, destination> over the past 24 hours" of block 314, the "Total bandwidth over past 24 hours for <source, destination>>threshold?" of block 316 outputs to the "Output an alert with <type, source, destination, contents, time>" of block 330 and the "wait for request on input stream" of block 300.

The "Add size of contents to bandwidth counter for 5-minute intervals for <source, destination>" of block 318 receives output from the "wait for request on input stream" of block 300 and outputs to a "Calculate bandwidth usage regularity from the 5-minute bandwidth counters over the past 8 and 48 hours" of block 320. After the "Calculate bandwidth usage regularity from the 5-minute bandwidth counters over the past 8 and 48 hours" of block 320 receives output from the "Add size of contents to bandwidth counter for 5-minute intervals for <source, destination>" of block 318, the "Calculate bandwidth usage regularity from the 5-minute bandwidth counters over the past 8 and 48 hours" of block 320 outputs to a "Bandwidth usage regularity for <source, destination> exceeds threshold?" of block 322. The "Bandwidth usage regularity for <source, destination> exceeds threshold?" of block 322 receives output from the "Calculate bandwidth usage regularity from the 5-minute bandwidth counters over the past 8 and 48 hours" of block 320 and outputs to the "Output an alert with <type, source, destination, contents, time>" of block 330 and the "wait for request on input stream" of block 300.

The "Training?" of block 324 receives output from the "wait for request on input stream" of block 300 and outputs to a "Record time of request for <source> relative to day (e.g., 4 p.m.)" of block 326 and a "Was request seen at similar time from <source> during training (Relative to day, e.g., 4 p.m.)" of block 328. After the "Record time of request for <source> relative to day (e.g., 4 p.m.)" of block 326 receives output from the "Training?" of block 324, the "Record time of request for <source> relative to day (e.g., 4 p.m.)" of block 326 outputs to the "wait for request on input stream" of block 300. The "Was request seen at similar time from <source> during training (Relative to day, e.g., 4 p.m.)" of block 328 outputs to the "wait for request on input stream" of block 300 and the "Output an alert with <type, source, destination, contents, time>" of block 330 after the "Was request seen at similar time from <source> during training (Relative to day, e.g., 4 p.m.)" of block 328 receives output from the "Training?" of block 324.

The "Output an alert with <type, source, destination, contents, time>" of block 330 receives output from one or more blocks selected from the group consisting of blocks 302, the "Short-term average drops below long-term average*threshold?" of block 310, the "Size of contents>threshold?" of block 312, the "Total bandwidth over past 24 hours for <source, destination>>threshold?" of block 316, the "Bandwidth usage regularity for <source, destination> exceeds threshold?" of block 322 and the "Was request seen at similar time from <source> during training (Relative today, e.g., 4 p.m.)" of block and 328.

The "wait for request on input stream" of block 300 receives output from one or more blocks selected from the group consisting of the "Does header contain suspicious values" of block 302, the "Short-term average drops below long-term average*threshold?" of block 310, the "Size of contents>threshold?" of block 312, the "Total bandwidth over past 24 hours for <source, destination>>threshold?" of block 316, the "Bandwidth usage regularity for <source, destination> exceeds threshold?" of block 322, the "Record time of request for <source> relative to day (e.g., 4 p.m.)" of block 326, the "Was request seen at similar time from <source> during training (Relative to day, e.g., 4 p.m.)" of block 328, and the "Output an alert with <type, source, destination, contents, time>" of block 330.

To evaluate Web Tap, web traffic was looked at from 30 clients over a 40-day period as well as traffic from known HTTP tunneling programs. Detecting different types of spyware and adware was successful as well as many datamining and advertisement servers. During the 40 days of observation, Web Tap generated alerts for adware clients such as Weatherbug, Kazaa, Lycos search bar, Google search bar, and Gator. It also was able to find programs which may be unwanted in a workplace environment such as iTunes, BitTorrent, and AIM Express. In addition to non-browser clients, Web Tap detected data mining and advertisement sites such as coremetrics.com, ru4.com abetterinternet.com, and doubleclick.net. Two of the three known HTTP tunneling programs tested, Wsh [12] and Firepass [11], immediately caused Web Tap to raise an alert. The third HTTP tunnel, Hopster [18], was detected an hour and twenty minutes after it began running. A custom HTTP tunnel that was designed, which does a better job of mimicking legitimate browser requests, was detected within seven hours. When the backdoor was actively used to transfer files, it was detected almost immediately.

Web Tap is able to detect new spyware and HTTP tunneling programs because it relies on anomaly detection, rather than signature analysis. Additionally, Web Tap runs at the network level, not the host level, and thus is more easily deployed for an organization that uses an HTTP proxy server for all its outbound web traffic.

The methods employed in Web Tap differ from previous work by targeting outbound rather than inbound communications, with the primary focus being on detection of HTTP tunnels. The fundamental barrier in analyzing outbound traffic is that, because of multitude of web services that can exist outside the system, it is difficult to collect enough data to do probabilistic analysis for every web application to build reasonable profiles; users go to new websites very often when browsing the web. For inbound HTTP requests to a web server, on the other hand, a profile can be built of appropriate requests, sizes of parameters, and typical sequences of web pages accessed over time, since all incoming requests are for the same web server [22].

Web Tap measures browsing patterns such as inter-request delay time, request size, and bandwidth usage. Web Tap uses this information to determine if the traffic is coming from a legitimate user, while previous research only looked at human browsing patterns for performance reasons.

In contrast to previous work, Web Tap does not deal with covert channels per se. The communication that Web Tap detects may be covert, but the channel is not. Furthermore, Web Tap does not claim to entirely eliminate tunnels. The main emphasis is on detection of covert tunnels, with a secondary objective of slowing them down, all without disrupting normal web browsing activity.

Web Tap Filter Design

The first phase of Web Tap's design was to monitor and record a number of web browsing statistics. Web Tap was set up as an extended proxy server written in Python. Python was chosen because it is easy to code, type-safe, and platform-independent. The original proxy code was taken from a post to a python discussion group [17]. The proxy server was extended to pass requests to a Web Tap measurement module before sending them to their final destination. The module did not block or modify any of the requests. The proxy server was run on a department computer within the University network. Web Tap can also be set up so that the statistics module is inactive and all the requests are logged. For each request, the complete request line and text of the headers with their values need to be logged. Also, the source IP address and the timestamp of the request need to be stored along with the request.

If it is a POST request, then the proxy must log the number of bytes sent following the headers to make sure it matches the content-length header value. Once the logging is complete, Web Tap can later run offline and perform analysis on the log files.

Users voluntarily configured the browsers on their computers to use the Web Tap proxy server. Thirty users participated in the study for a period of 40 days. The first week of data collection was designated as a training period and used to help design the filter thresholds. During that time, no filters were active. Web Tap passively monitored a number of statistics to detect trends in human web surfing behavior. The following measurement results and filter thresholds are based on the trends observed during the one-week training period.

Bandwidth and request size measurements do not reflect the actual number of bytes sent from the workstation to the web server. Only bytes that can be modified without setting off a header alert are counted. (A header alert is raised when an HTTP request is sent that is formatted differently from a browser request. An example would be adding a field at the end of an HTTP request "webtap-data: a7Hc . . . ." The field would contain additional data, but would be detected first by the header filter.)

This includes bytes in the URL following the hostname, any information after the headers in a post request, one bit for the presence or absence of each optional header field, and variable header values. An additional two bytes are added to help mitigate the effects timing and other covert channels. The two bytes help by increasing the significance of very small requests, which makes it harder for a hacker to send many one or two-byte messages and leak out more than one or two bytes of information through auxiliary channels. Some header fields, such as cookie, can only have a constrained set of values. A backdoor, however, could forge cookies and include information not sent by the server. Right now, Web Tap calculates the number of bytes in the request assuming that all the headers have legitimate values. An additional state in Web Tap may be kept to verify header integrity.

Web Tap is configured to measure a limited set of browsing statistics. Other possible measurements include: request type (Image, HTML, CGI, etc.), request content, inbound bandwidth, and inbound content. Request type frequencies varied greatly from host to host and thus were too not useful for inferring anomalies. Some sites only served CGI, while others only served images or HTML documents. Web Tap did not attempt to perform content analysis on the transactions because there are too many data hiding techniques such as steganography [29] which are very difficult to detect. Web Tap also does not attempt to monitor inbound bandwidth usage. Generally speaking, web server replies are much larger than client requests. Even the simplest web page, www.google.com, contains approximately 3000 bytes. The aggregate inbound bandwidth usage would be so large that it would be hard to detect any additional hidden data in replies. Instead, Web Tap focuses on outbound requests because they tend to contain far less data and are more useful for detecting covert traffic.

Header Formatting

Web Tap parses each header and generates an alert when it sees a header that is indicative of a non-browser request. Web Tap also monitors the version of browser and operating system from which requests are being made. If a backdoor sends out Internet Explorer with Windows XP headers when all the computers are running Windows 98, it can be easily detected by the header format filter. Header formatting detection proved to be a useful tool for detecting nonbrowser web requests. In addition to the standard browsers, (IE and Netscape/Mozilla) it was able to recognize requests from seven different clients in only 24 hours: Windows Update, iTunes, Gator, AIM Express, Windows Media Player, McAfee Web Update, and BitTorrent.

The header format filter does a good job of detecting unwanted clients, as well as many HTTP covert tunnels in their default settings. It can also be used to enforce policies that prevent employees from using clients such as iTunes and AIM Express, and detect some adware programs like Gator. Incidentally, one of the clients detected during the training period, Unicast (unicast.com), set off the header format alarm because it spelled the word "referrer" correctly in the HTTP request. According to the HTTP specification [14] it should be spelled incorrectly as "referer." This is good example of how easy it can be for a hacker to make a mistake when designing a tunneling program.

Delay Times

Web Tap measures the inter-request arrival time for a specific web server from a specific client so programs that make periodic outbound requests, operating on timers, can be detected. Delay times were measured on a per-site basis for each user and stored both in individual vectors and in an aggregate format for all users. The aggregate vector was used to observe the general distribution of inter-request delays. FIG. 7 shows the probabilistic distribution of all delay times between site accesses. One can notice jumps in the cumulative distribution curve at 30 seconds, 4 minutes, and 5 minutes. There are also less-pronounced jumps at 15 minutes, 30 minutes, and one hour. These jumps indicate the presence of sites that refresh using a timer.

The jumps can be observed more clearly if the derivative with respect to the y-axis of the distribution is taken. This can be seen in FIG. 8. The derivative is plotted along with its running average multiplied by 0.8. The average helps to illustrate places where the derivative drops below the amount of a normal fluctuation. The dips in the derivative that drop below the dotted line correspond to jumps in the distribution at times 30 seconds, 60 seconds, 90 seconds, 4 minutes, 5 minutes, 15 minutes, 30 minutes, 60 minutes respectively. Equations for the derivative and the average can be found in FIG. 9. V is a vector of delay times taken from every nth element in the full delay vector for a site. The maximum of the square root of the full vector size or five for n were chosen. The value a represents the number of values used in the running average. The maximum of the square root of the size of V or 3 for a were picked.

Individual Request Size

Requests to most sites contain very little information. A hacker would need to send out large amounts of data in order to transfer files and view big directory listings on the remote host. Web Tap monitors request sizes to help detect use of such techniques. FIG. 10 illustrates the distribution of maximum request sizes for all users and sites. Out of approximately 1600 unique web servers which received requests, only eleven saw requests of over 3 KB, and only four had requests in excess of 10 KB. Most of these large requests were indicative of file uploads. A good number of them, however, were attributed to ASP scripts with large forms. Some ASP POST requests got as large as 6 KB.

After examining the maximum request size distribution, the most effective filter threshold for single requests appears to be about 3 KB. This setting allows Web Tap to detect almost any file upload using HTTP POST requests. It is also high enough to keep the false alarm rate low. Preventing large post requests will force a hacker to break up transactions and increase the chance of getting caught by one of the other filters.

Outbound Bandwidth Usage

During the training period, Web Tap measured outbound bandwidth on both an aggregate and per-site basis for each user. Total bandwidth consumption was found to contain no useful information that could not be found in the per site measurements, and thus is omitted here. Per user bandwidth was measured mainly to determine what times of day the user is active, not to filter out large bandwidth consumers.

Much like single request sizes, per site bandwidth numbers are pretty low. FIG. 11 shows the cumulative distribution of total daily bandwidth usage for thirty users on a per destination-site basis during the training period. For a majority of the sites (>99%), users did not consume more than 20 KB of request bandwidth in a single day. Based on the data, 20 KB appears to be a good lower bound for a daily bandwidth filter threshold. During the one-week training period, 48 of the daily byte-counts exceeded 20 KB. This could be a large amount for a system administrator to sift through, especially considering that these would also contain a significant number of false positives. It may be a good threshold, however, for a high-security network. If the filter was set any lower than 20 KB, then there would be too many false positives.

Of the sites measured, less than 0.1% used over 60 KB of request bandwidth in a single day. All of these were true positives generated by non-browser clients and data mining advertisements. Thus, based on the data, it was concluded that the daily bandwidth threshold should be set no higher than 60 KB.

Request Regularity

Opposing traffic patterns can be measured by request regularity. The resulting filter is able to detect a backdoor that makes frequent callbacks, even if the requests are interlaced with legitimate traffic to avoid delay time detection.

Two different methods are used to measure request regularity. The first is to count the number of time periods where a particular site is accessed by the user being observed. Web Tap counts the number of 5-minute intervals that have non-zero bandwidth usage over 8-hour and 48-hour time periods. If requests appear too often, then the site is classified as being accessed by an automated process. FIG. 12 shows a plot of bandwidth counts over an 8-hour time period for approximately 400 sites accessed by a single user. Using a threshold of 16% activity, seven sites were filtered out with no false positives. Five of these were in blatant violation of the threshold; they were active consistently throughout the whole eight hours. The two other sites detected served advertisements that refresh frequently and are persistent throughout browsing sessions. There were also five sites close to the detection threshold (between 10% and 16%), only two of which were false positives, both from livejournal.com. The 16% threshold was chosen conservatively to avoid false alarms and could be lowered even further for a low-traffic network.

The second method used is the coefficient of variation technique. To determine the regularity, the standard deviation of bandwidth usage is calculated and divided by the mean bandwidth usage. Conceptually, this number represents a normalized deviation of bandwidth usage. If a site is accessed in short bursts, which is characteristic of normal human activity, then the coefficient of variation will be high. Low variation in bandwidth usage is indicative of abnormal or non-human activity. The plot of the coefficient of variation measurements for an 8-hour time period can been seen in FIG. 13. Thresholds of 3.3 for 8 hours and 4.5 for 48 hours were found to be effective. At those settings, the coefficient of variation method detected nine sites in violation of the threshold both over an 8-hour and a 48-hour period, none of which were false positives. Much like the sites close to the threshold for the counting method, three of the five sites just above 3.3 were false positives, all associated with livejournal.com. For a smaller network, the threshold for this filter could be effectively raised to around 4.0 for an 8-hour period without producing many false positives. All of the seven sites filtered by the counting method were also filtered by the coefficient of variation method.

Web Tap uses both of these measurements, even though they would have resulted in identical filtering during the training period. The primary reason is that the assumption that more filters will not hurt, unless they are generating additional false alarms. For example, if an adversary had to only evade the coefficient of variation filter and wanted to make callbacks every 10 minutes, then he or she would just have to make a single large request (~2500 bytes) every 48 hours, and a smaller big request (~200 bytes) every 8 hours. The hacker's solution would, however, fail if both filters are deployed.

Request Time of Day

Web Tap recorded the time of day when users typically browse the web on a per-user basis. People tend to follow a schedule and do their browsing at set times. This is illustrated in FIG. 14 by the browsing activity seen for a randomly selected user during the first six days of observation. The activity times stay fairly consistent from day to day. If requests are seen during a time when the user is usually inactive, then an intrusion alert can be raised. This approach would be even more effective when applied in a workplace instead of a home environment, where users tend to have more rigid schedules. As an extension of this, day of week and holidays could be monitored in a work environment where schedules are predetermined.

In a home environment, unlike a place of work, users' schedules are more subject to change. This is especially true for college students who have part time jobs and subsequently have schedules that vary from day to day. Even though most of the test subjects were college students, they still showed striking patterns in usage times.

Evaluation

After the one-week learning period, the filters were put to the test against several HTTP tunneling programs, as well as 40 days of web traffic from 30 users. During the evaluation, all the filters were active for every site and user. The purpose was to determine how difficult it would be for a hacker to avoid detection by Web Tap, how much bandwidth would be available to the hacker, and the false alarm rate for the filters and thresholds used by Web Tap. No special filter rules or settings were used to reduce the number of false positives. However, Web Tap filters may be customized.

Filter Performance Over Full Observation Period

After the first week of measurements designated as the training period, Web Tap was run with its new filters on traffic from the same clients over 40 days. The following section describes the results from the alert logs over the full observation period for approximately 30 clients. From the 40 days worth of data collected, 428,608 requests were made to 6441 different websites, and the proxy log file was 300 Megabytes in size. Following collection, the information was analyzed by Web Tap in offline mode. An overview of the analysis results from the 40-day period can be found in the Table of FIG. 15. The set of requests that were considered false positives varied depending on the filter under consideration. For this experiment, false positives by hand were evaluated. The type of requests that are false positives can be seen in the Table in the right-hand column. (An ad server is a web server that hosts refreshing advertisements, such as doubleclick.net.) In addition to the short description given for false positives, any alert generated by a Trojan or HTTP tunnel was considered a true positive, though none were observed during the evaluation period.

Including those mentioned above, Web Tap detected 17 different non-browser clients and one non-standard browser using the header format filter. Six of the clients detected were unwanted spyware programs. The other eleven clients included those mentioned earlier such as Windows Update, McAfee Web Update, and iTunes. It was also found that 5 out of the 30 observed unique clients had some form of adware on their computer just based on the header filter results. In addition to the spyware clients, others were detected that may not be desirable in a work environment. These included Kazaa, iTunes, AIM Express, and BitTorrent. Once detected, Web Tap (or the proxy server) could be set to block, allow but log, or completely allow certain clients according to network policy.

The large number of header alerts can be attributed to the fact that Web Tap raises an alarm when it sees a bad header once for each web server per user. This means that if iTunes were to access 10 different sites, each would generate an alarm. The repetition of positives may be reduced by only raising an alarm once per client type per user and also filtering out alerts from allowed clients.

For the delay time measurements, website access times were logged using one-second granularity. More precision was not used because none of the timers observed had periods of less than 30 seconds. In order to detect shorter-period timers, additional precision would be required to differentiate a timer from repeated short delay times.

Although the false positive rate for the delay time filter was low (average of one false alarm every 6 days for our test group), several legitimate websites that refresh using a timer set off alarms. News and sports sites, such as espn.com and nytimes.com, tended to be the primary culprits. One way of filtering out legitimate sites with timers is to create a list of trusted sites that are allowed to have fixed-interval callbacks. However, callbacks to trusted sites can be used to leak information.

For the individual request size filter, approximately 35% of the alarms were associated with file uploads. Almost all the other true positives came from data-mining spyware programs. The false positives observed were largely ASP and shopping cart scripts from sites such as www.americanexpress.com and www.sprintpcs.com. Some websites contained forms with very large amounts of data that would be sent in single post requests. A possible method for dealing with this problem, similar to the solution proposed for delay time false positives, and with similar risks, would be to create a database of trusted servers. The database could include popular websites that have very large forms, but do not allow a user to leak data outside of the network through file uploads, public message posting, or other means.

As seen in the Table of FIG. 15, the daily bandwidth filter generates more alerts as well as more false positives as its threshold decreases. Multiple measurements were taken so that a security administrator can decide between increased security and false alarms. For the lowest number of false positives, a threshold of 60 KB appears to be reasonable for small group sizes. The threshold can, however, be set lower. For the 20 KB limit, the false alarm rate is just under one per day. Depending on the level of security desired, a moderate threshold between 30 and 50 KB will keep the false positives at a manageable level, and make sure that most of the real positives are caught. The false positives seen for the daily bandwidth filter, much like the request size filter, consisted mainly of sites with large ASP or shopping cart scripts such as www.tvguide.com and www.sephora.com. The performance of the daily bandwidth filter could be enhanced by giving a higher threshold to popular sites from a list that tend to generate false positives. If the number of false positives is reduced, then a system administrator can lower the detection threshold and find more malicious traffic. Also, true positives could be consolidated by communication between the different filters. Many of the sites detected by the bandwidth filter, such as Gator and doubleclick.net, were found by other filters as well.

The regularity filter results seen in the Table of FIG. 15 consisted of both count and coefficient of variation measurements. The number of false positives generated by this filter were considered to be acceptable (approximately one false alarm every three days). The sites that caused false alarms were only the very popular ones such as ebay.com and livejournal.com. Many of the sites flagged by the regularity filter were found by the delay time filter as well. The regularity filter did, however, find an additional type of adware that the delay filter was unable to detect: browser search bars. This particular breed of advertising program imbeds itself into the person's browser and calls back to its host every time the browser opens up as well as throughout browsing sessions. These are different from other adware programs because their callbacks are triggered by human activity and thus cannot easily be differentiated from a person based on inter-request delay times. Web Tap successfully detected sites that used frequent requests with this filter, even if they coincided with human usage.

The time of day filter was initially configured so that the first week of the 40-day period was used for training. After seeing preliminary results, the training time was lengthened to the first two weeks of the 40-day period in order to increase the effectiveness of the filter. During the first two weeks, no alerts were generated because all requests were representative of normal activity. For the training period, spyware and adware programs were active. Fixed-length timer or other non-human activity was not removed from the training data. The effectiveness of training could be improved to generate more true positives by removing traffic for sites which set off the delay time or regularity alarms. Nevertheless, Web Tap was still able to detect programs such as Gator and Wildtangent even though they had been active during the training period.

Filter Performance for HTTP Tunnels and a Web Backdoor Program

For the purposes of this experiment, several available programs were used that help tunnel TCP traffic over HTTP. These included Wsh [12], Hopster [18] and Firepass [11]. The tested programs are primarily designed to help people inside a network bypass firewall restrictions, for example, to get a shell from a firewalled machine to a remote machine outside the network. A specially designed backdoor program, Tunl, was included which allows a user (hacker) outside the network to get a shell on a machine inside the firewalled network. The results from running these four programs are now described.

Third Party HTTP Tunnels

The three tunneling programs were installed on a workstation using the Web Tap proxy and attempted to send out information using each. Web Tap was immediately able to detect both Wsh and Firepass since they used custom header fields in their requests. After the initial connection, data could not be transferred using Firepass. Wsh did work properly, and it was detected by Web Tap's single request size filter upon transferring a small file (approximately 5 KB). Wsh, however, had to be initiated by the client and so did not call back or set off any other alarms.

Hopster was used to tunnel traffic from AOL Instant Messenger. It began running at 10:30 PM and no messages were sent during the night. The next day, 10 KB of data was sent out around Noon. Hopster was not detected immediately like Firepass and Wsh because it used browser-like request headers. Unlike the other two programs, Hopster did make frequent callbacks to the server that were detected by Web Tap's regularity filter after 80 minutes, delay time filter after two hours, and 20 KB daily bandwidth filter after three hours.

Tunl Design

To further evaluate Web Tap, a prototype remote shell backdoor called Tunl was designed. It is made to simulate the situation, which allows a user (hacker) outside the network to get a shell on a machine inside the firewalled network. Tunl is written for Windows, a popular target for hackers. It consists of two executables, TunlCli.exe (to run on the compromised host) and TunlServ.exe (to run on hacker's machine), which together provide a remote command shell on the compromised Windows machine. It is designed to tunnel through an HTTP proxy server, but can be set to go through a non-proxy web connection as well.

The first thing TunlCli does when it starts up is launch a hidden command shell with redefined standard input, output, and error handles. It then listens indefinitely to the standard output from the shell, and sends any information back to TunlServ. In addition to sending data from the standard output, it makes periodic callbacks to check for server commands. Any data received from the server is then piped to the standard input of the command shell for processing. Custom get and put commands, which are not piped to the shell, are included in Tunl for easy file transfers. To avoid sending too many small requests, data is buffered and sent out every 100 milliseconds. Because only outbound requests from the compromised machine via the proxy are allowed, when the hacker enters a command on his computer, the shell has to wait for the client to make an HTTP request before sending the command in the body of an HTTP reply. The response to the server's command is sent back in a subsequent HTTP POST request. All messages exchanged are designed to emulate Internet Explorer on Windows XP accessing an Apache web server.

Though Tunl did not provide compression or encryption, it was tested with transferring compressed content. Though some tunneling programs support encryption (e.g., Wsh), encryption was largely immaterial to Web Tap since it does not examine data content. Tunl uses a one hour timer to schedule its callbacks and retries twice at 30 second intervals in the case of a failed connection. Since Tunl's communication protocol was modeled after Internet Explorer requests and Apache replies, it did not set off any of the header alerts in any test cases.

Tunl with Callback only Workload

To evaluate the performance of Web Tap, the Tunl program was installed on one of the machines. The first workload tested only contained callbacks to the Tunl server. This represents the time when a machine is first compromised and the backdoor begins making callbacks, but the hacker has not yet started using the shell to execute commands on the compromised machine.

The results for the Tunl client only making callbacks using a timer were very promising. Even though no data was being transferred, the traffic from this trace was caught by the request regularity, the delay time, and the time of day filters. The 8-hour coefficient of variation bandwidth filter detected the web tunnel 6 hours and 40 minutes after the first callback. The 8-hour activity count filter was unable to detect the backdoor. The program did, however, break the threshold for the 48-hour count filter after about 26 hours. Since the backdoor was running on a timer, the delay time filter was able to detect it in 2 hours and 10 minutes. As far as the time of day filter, the delay until detection varies depending on the individual user's habits as well as the time of initial callback. The time of day filter was triggered by the backdoor very shortly after a time of usual inactivity began.

Minimal Workload

The second test case consists of a hacker using the Tunl shell to go to the local documents directory (containing approximately 180 documents), listing all the files, and downloading a single 500-word uncompressed document with minimal formatting (approximately 25 KB). This is a minimal activity scenario where the hacker only lists one directory and downloads a single small file. Any hacker who compromises a machine is almost sure to do at least this much.

The minimal workload immediately violated the threshold for the maximum request size filter. It also exceeded the total daily bandwidth threshold of 40 KB. Even though the file was only 25 KB, the uncompressed directory listing for around 180 different files was larger than 15 KB. It also went on to trip the delay time and request regularity filters. The presence of more concentrated activity, however, made the backdoor harder to detect using the coefficient of variation regularity measurement. Instead of detecting Tunl in around 7 hours, the coefficient of variation measurement did not pass the threshold until after the file transfer activity was beyond the 8-hour measurement window.

Moderate Workload

The third test case used represented a moderately intense hacker session. It consisted of listing all local documents and desktop directories for one user on the machine. Following the directory list requests, a variety of files including two income tax returns (PDF format), one JPG image, three small Word documents, and a text file containing a 1000-address mailing list were all compressed and downloaded. Using a common compression utility, all these files together amounted to a 300 KB zip file. 300 KB it is actually a moderate, if not small, amount of data to download from a compromised machine; it represents less than $1/100,000$ the disk space available on a common 40 GB hard drive.

The alert logs for the moderate workload were almost the same as those or the minimal workload. The only difference between alerts is that the moderate workload surpassed the highest daily bandwidth usage threshold of 80 KB instead of the just the 40 KB seen during the minimal workload. The moderate workload did take longer than the minimal workload to complete. The difference, however, was from two minutes to ten minutes. Since Web Tap records bandwidth in 5-minute intervals, this did not really change results from other filters.

An enhancement to Web Tap is allocating different bandwidth quotas for different groups of sites. Trusted sites that are known to be frequently used can be given higher bandwidth limits than others. This helps mitigate attacks by tunnels that mimic access patterns of high-usage legitimate sites. Such a strategy allows for the tightening of thresholds for the remaining sites (or groups of them), thus limiting the bandwidth available for covert communication.

There are several techniques to decrease false positive rate. One simple way of reducing false positives for all filters is to create a database that keeps track of hosts that tend to set off alarms. If a system administrator wishes to allow users to access AIM express and Weatherbug, for example, then these sites may be added to an ignore list for header, delay time, and request regularity alerts. However, this increases the risk of leakage of data via permitted sites, and this is a tradeoff that system administrators will have to make.

Another possibility for the reduction of requests and bandwidth usage for hosts is proxy caching (with the proxy cache placed before Web Tap). If proxy caching is enabled, then all the hits do not need to be recorded by Web Tap. Removing cache hits would help isolate web tunnel activity because all of the tunnel requests would miss. The number of legitimate requests going through Web Tap would decrease, while the number of anomalous requests would remain the same thus making them potentially easier to detect.

Another way of reducing false positives for bandwidth filters could be to compress all large transactions. This would dramatically reduce the size of large requests that would normally generate false positives. Just to give an example of the effects of compression, a 3.87 KB POST request that triggered an alarm was compressed to 2.07 KB, nearly half of its original size. Compression could help isolate malicious traffic in similar scenarios. Good hackers are also likely to compress and encrypt data before sending it over the network, which prevents it from being compressed any further. Legitimate requests would be significantly reduced in size, while tunnel requests would not, thus increasing the chances of the bandwidth filter catching true positives.

SUMMARY

Web Tap is a security threat detection system. It monitors application layer network transactions or messages (HTTP web requests in particular) between one or more computers of a protected network and those outside of the protected network (usually websites on the internet). Web Tap is designed to combat the following security threats:

1. Spyware/Adware. Spyware or adware programs are traditionally detected and removed using scanners on the infected host, not by monitoring network traffic from the infected host.

2. Backdoors. A backdoor is a program, typically installed by a hacker, which gives an entity remote access (in order to view/modify files and run arbitrary programs) to a computer via the network transactions.

3. Insider Information Leaks. Web Tap looks for legitimate users who deliberately send large amounts of information (potentially sensitive) to an external network via web requests. This can be done through file uploads to web mail, large message board posts, etc.

Web Tap works by monitoring HTTP transactions (Application-layer TCP port 80) initiated by a computer or plurality of computers. Note that Web Tap can also be applied to transactions using other application-layer protocols such as SMTP (mail) on port 25, and SSL (encrypted web) on port 443, as well as others. Web Tap can be deployed in one of the following ways so that it has access to the network traffic:

1. Locally. Web Tap can be deployed locally on a single computer and intercept network messages going to and from the machine.

2. Network Perimeter. Web Tap can be deployed at the edge of a network (router or firewall, for example) so that it has access to all of the web traffic going in and out of the network.

3. Proxy Server. If a network has an HTTP proxy server, Web Tap can be deployed alongside the proxy server to monitor outbound web requests.

Web Tap uses a set of heuristics to detect the various threats mentioned above. These heuristics help differentiate between human and machine based web requests, and also look for unusually large amounts of data being sent from a network. Web Tap does rely on attach signatures to detect security threats.

If traffic from a particular host inside a protected network to a particular host outside that network (identified by URL such as www.google.com, or IP address such as 64.231.11.4) surpasses the threshold for any one of the following filters, then Web Tap will raise an alert notifying a security administrator, but will not take any other action. Note that the thresholds for these filters are statically assigned by a system administrator during installation. Thresholds reflect the properties of and desired level of security for the network.

1. Header Format. If an individual HTTP request is seen that is formatted in such a way that it could not have been from a standard browser (an example would be custom HTTP request header fields), the Web Tap will immediately raise an alert. This method is very effective for detecting web requests from non-browser programs including many types of spyware, adware, and other potentially unwanted clients such as iTunes and Kazaa.

2. Inter-Request Delay Time. Web Tap records the delays in between two sequential requests for the same external host. It inserts each delay measurement into a list of inter-request delay times. It then sorts the list and computes the change in the delay time with respect to the index in the sorted list. If the value for a pair of intervals drops below the moving average of the delay times, then Web Tap raises an alert. This method is very effective at detecting timed callbacks to a site. If a program goes to a website exactly every 15 minutes using a timer, then the change in the delay times with respect to the index in the sorted delay time list will be very close to zero and thus will trigger an alert.

3. Individual Request Size. Most individual web requests do not contain much information; a majority of the total bytes exchanged are in the web server's reply. For example, "GET www.google.com HTTP/1.1" only contains a few bytes of information that are not constrained by the HTTP protocol. Web Tap counts the number of bytes present in each web request and raises an alert whenever it sees a single request with an unusually large number of bytes. The exact threshold can be adjusted depending on the usage profile of the particular network.

4. Outbound Bandwidth Usage. Because the individual request size filter can be easily avoided by sending a large volume of smaller requests, Web Tap also monitors the aggregate outbound bandwidth to each host per day. The maximum number of bytes that can be sent before Web Tap generates an alert is set depending on the environment in which Web Tap is deployed.

5. Request Regularity. Most people do not browse a single website for a really long amount of time. Web Tap measures how often requests are made to a particular site over 8-hour and 48-hour intervals. It counts the number of 5-minute intervals in which a request was seen, and also calculated the coefficient of variation (standard deviation divided by the mean) for bandwidth usage measurements over the 5-minute intervals. A threshold is set for the maximum number of 5-minute intervals and if it is exceeded, then Web Tap generates an alert. If the coefficient of variation value drops below a set threshold, Web Tap also raises an alert.

6. Request Time of Day. Web Tap monitors the time of day that requests are made in order to determine if a request occurs at a time when the user is not present. Web Tap builds a usage profile during a training period; after the training period is over, Web Tap generates an alert whenever it sees traffic during times that the user is typically not active (for example, 3 AM in a workplace where employees typically work 9-5 M-F).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of detecting security threats in a computer network, the method comprising:
    receiving a data stream which represents outbound, application layer messages from a first computer process to at least one second computer process wherein the computer processes are implemented on one or more computers;
    specifying at least one legitimate application from which the outbound, application layer messages are considered legitimate;
    creating a specification of header values that can be generated by the at least one legitimate application;
    monitoring the data stream using a set of application layer heuristics related to a set of possible legitimate behavior of the at least one legitimate application with respect to a plurality of servers outside the network to detect, outbound, application layer messages that were not generated by the at least one legitimate application wherein the at least one legitimate application is able to communicate to the plurality of servers and wherein the step of monitoring includes the step of detecting messages that contain header values not in the specification thereby indicating a potential security threat wherein the set of heuristics includes at least one of:
    a first filter that determines if application-layer message header formatting matches that of at least one legitimate application; and
    a second filter that measures the amount of data in application-layer messages to obtain measurements and compares the measurements to at least one of a single-message threshold and an aggregate threshold, both filters discounting the size of expected fields from the measurements; and
    generating a signal based on the potential security threat wherein the security threats include communication activity from unwanted software or programs via the outbound application-layer messages.

2. The method as claimed in claim 1, wherein the messages include HTTP messages.

3. The method as claimed in claim 1, wherein substantially all of the computer processes are implemented inside the network.

4. The method as claimed in claim 1, wherein at least one of the second computer processes is implemented outside of the network.

5. The method as claimed in claim 1, wherein the set of heuristics include a plurality of filters, each of the filters having a threshold which represents properties of and a desired level of security for the network.

6. The method as claimed in claim 5, wherein one of the filters is an inter-request delay time filter.

7. The method as claimed in claim 5, wherein one of the filters is an individual request size filter.

8. The method as claimed in claim 5, wherein one of the filters is an outbound bandwidth usage filter.

9. The method as claimed in claim 5, wherein one of the filters is a request regularity filter.

10. The method as claimed in claim 5, wherein one of the filters is a request time of day filter.

11. A system for detecting security threats in a computer network, the system comprising:
    a processor operable to execute computer program instructions;
    a memory operable to store computer program instructions executable by the processor; and
    computer program instructions stored in the memory to perform the steps of:
    a) receiving a data stream which represents outbound, application layer messages from a first computer process to at least one second computer process wherein the computer processes are implemented on one or more computers;
    b) specifying at least one legitimate application from which the outbound, application layer messages are considered legitimate;
    c) creating a specification of header values that can be generated by the at least one legitimate application;
    d) monitoring the data stream using a set of application layer heuristics related to a set of possible legitimate behavior of the at least one legitimate application with respect to a plurality of servers outside the network to detect, outbound, application layer messages that were not generated by the at least one legitimate application wherein the at least one legitimate application is able to communicate to the plurality of servers and wherein the step of monitoring includes the step of detecting messages that contain header values not in the specification thereby indicating a potential security threat wherein the set of heuristics includes at least one of:
    a first filter that determines if application-layer message header formatting matches that of at least one legitimate application; and
    a second filter that measures the amount of data in application-layer messages to obtain measurements and compares the measurements to at least one of a single-message threshold and an aggregate threshold, both filters discounting the size of expected fields from the measurements; and
    e) generating a signal based on the potential security threat wherein the security threats include communication activity from unwanted software or programs via the outbound application-layer messages.

12. The system as claimed in claim 11, wherein the messages include HTTP messages.

13. The system as claimed in claim 11, wherein substantially all of the computer processes are implemented inside the network.

14. The system as claimed in claim 11, wherein at least one of the computer processes is implemented outside of the network.

15. The system as claimed in claim 1, wherein the set of heuristics include a plurality of filters, each of the filters having a threshold which represents properties of and a desired level of security for the network.

16. The system as claimed in claim 15, wherein one of the filters is an inter-request delay time filter.

17. The system as claimed in claim 15, wherein one of the filters is an individual request size filter.

18. The system as claimed in claim 15, wherein one of the filters is an outbound bandwidth usage filter.

19. The system as claimed in claim 15, wherein one of the filters is a request regularity filter.

20. The system as claimed in claim 15, wherein one of the filters is a request time of day filter.

21. A computer program product for detecting security threats in a computer network, the product comprising:

a computer readable non-transitory tangible medium; and computer program instructions recorded on the medium and executable by a processor for performing the steps of:

a) receiving a data stream which represents outbound, application layer messages from a first computer process to at least one second computer process wherein the computer processes are implemented on one or more computers;

b) specifying at least one legitimate application from which the outbound, application layer messages are considered legitimate;

c) creating a specification of header values that can be generated by the at least one legitimate application;

d) monitoring the data stream using a set of application layer heuristics related to a set of possible legitimate behavior of the at least one legitimate application with respect to a plurality of servers outside the network, to detect outbound, application layer messages that were not generated by the at least one legitimate application wherein the at least one legitimate application is able to communicate with the plurality of servers and wherein the step of monitoring includes the step of detecting messages that contain header values not in the specification thereby indicating a potential security threat wherein the set of heuristics includes at least one of:

a first filter that determines if application-layer message header formatting matches that of at least one legitimate application; and a second filter that measures the amount of data in application-layer messages to obtain measurements and compares the measurements to at least one of a single-message threshold and an aggregate threshold, both filters discounting the size of expected fields from the measurements; and e) generating a signal based on the potential security threat wherein the security threats include communication activity from unwanted software or programs via the outbound application-layer messages.

22. The method as claimed in claim 1, wherein the at least one legitimate application includes a Web browser and wherein the set of possible legitimate behavior includes a subset of possible Web requests from the browser to the servers.

23. The system as claimed in claim 11, wherein the at least one legitimate application includes a Web browser and wherein the set of possible legitimate behavior includes a subset of possible Web requests from the browser to the servers.

24. The computer program product as claim in claim 21, wherein the at least one legitimate application includes a Web browser and wherein the set of possible legitimate behavior includes a subset of possible Web requests from the browser to the servers.

* * * * *